United States Patent
Kuo et al.

(10) Patent No.: US 12,378,434 B2
(45) Date of Patent: Aug. 5, 2025

(54) CURABLE COATING COMPOSITIONS

(71) Applicant: Eastman Chemical Company, Kingsport, TN (US)

(72) Inventors: Thauming Kuo, Kingsport, TN (US); Nick Allen Collins, Fall Branch, TN (US)

(73) Assignee: Eastman Chemical Company, Kingsport, TN (US)

( * ) Notice: Subject to any disclaimer, the term of this patent is extended or adjusted under 35 U.S.C. 154(b) by 670 days.

(21) Appl. No.: 17/309,118

(22) PCT Filed: Dec. 6, 2019

(86) PCT No.: PCT/US2019/064868
§ 371 (c)(1),
(2) Date: Apr. 27, 2021

(87) PCT Pub. No.: WO2020/123278
PCT Pub. Date: Jun. 18, 2020

(65) Prior Publication Data
US 2021/0388229 A1 Dec. 16, 2021

Related U.S. Application Data

(60) Provisional application No. 62/777,876, filed on Dec. 11, 2018.

(51) Int. Cl.
*C08K 5/07* (2006.01)
*C08G 63/18* (2006.01)
*C08G 63/82* (2006.01)
*C08K 5/00* (2006.01)
*C09D 167/02* (2006.01)

(52) U.S. Cl.
CPC .......... *C09D 167/02* (2013.01); *C08G 63/18* (2013.01); *C08G 63/82* (2013.01); *C08K 5/0025* (2013.01); *C08K 5/07* (2013.01)

(58) Field of Classification Search
CPC ...... C09D 167/02; C08G 63/18; C08G 63/82; C08K 5/0025; C08K 5/07
See application file for complete search history.

(56) References Cited

U.S. PATENT DOCUMENTS

| | | | |
|---|---|---|---|
| 4,071,578 A | 1/1978 | Lasher | |
| 4,708,821 A | 11/1987 | Shimokawa et al. | |
| 5,288,802 A | 2/1994 | Walters et al. | |
| 5,288,804 A | 2/1994 | Kim et al. | |
| 5,321,118 A * | 6/1994 | Hubbs | C08G 63/6856 564/204 |
| 5,426,148 A | 6/1995 | Tucker | |
| 5,453,464 A | 9/1995 | Witzeman et al. | |
| 5,462,992 A | 10/1995 | Wilt et al. | |
| 5,693,705 A | 12/1997 | Kubo et al. | |
| 5,714,563 A | 2/1998 | DePompei et al. | |
| 6,057,001 A | 5/2000 | Schoonderwoerd et al. | |
| 6,117,492 A | 9/2000 | Goldstein et al. | |
| 6,177,514 B1 | 1/2001 | Pathak et al. | |
| 6,203,607 B1 | 3/2001 | Schoonderwoerd et al. | |
| 6,521,716 B1 | 2/2003 | Leake | |
| 6,683,132 B1 | 1/2004 | Schick et al. | |
| 8,653,174 B2 | 2/2014 | Anderson et al. | |
| 8,664,333 B2 | 3/2014 | Shibutani et al. | |
| 8,962,725 B2 | 2/2015 | Brinkhuis et al. | |
| 9,181,452 B2 | 11/2015 | Brinkhuis et al. | |
| 9,181,453 B2 | 11/2015 | Brinkhuis et al. | |
| 9,260,626 B2 | 2/2016 | Brinkhuis et al. | |
| 9,284,423 B2 | 3/2016 | Brinkhuis et al. | |
| 9,534,081 B2 | 1/2017 | Brinkhuis et al. | |
| 9,587,138 B2 | 3/2017 | Brinkhuis et al. | |
| 9,598,602 B2 | 3/2017 | Kuo et al. | |
| 9,650,539 B2 | 5/2017 | Kuo et al. | |
| 10,563,040 B2 | 2/2020 | Kuo et al. | |
| 11,261,359 B2 | 3/2022 | Boggs et al. | |
| 11,434,400 B2 | 9/2022 | Dougherty et al. | |

(Continued)

FOREIGN PATENT DOCUMENTS

DE 196 20 351 A1 11/1997
EP 0 161 697 A1 11/1985

(Continued)

OTHER PUBLICATIONS

Schoenmakers, D.C. et al., Crosslinking of fibrous hydrogels, 9 Nature Commans 2172 (Year: 2018).*
Office Action dated Apr. 4, 2023 received in co-pending U.S. Appl. No. 17/309,121.
Office Action dated Jul. 31, 2023 received in co-pending U.S. Appl. No. 17/309,121.
Notice of Allowance dated Jul. 27, 2023 received in co-pending U.S. Appl. No. 16/705,345.
European Search Report Application No. 19896953.7 dated Sep. 12, 2022.

(Continued)

*Primary Examiner* — Robert C Boyle
(74) *Attorney, Agent, or Firm* — Polly C. Owen; Judith C. Rawls

(57) ABSTRACT

This invention relates to a curable coating composition comprising: I. at least one acetoacetate functional polyester further comprising the residues of a. a hydroxyl component comprising: i. a diol in an amount ranging from 70 to 100 mole %, based on the total moles of (i) and (ii); and ii. a polyol in an amount ranging from 0 to 30 mole %, based on the total moles of (i) and (ii); b. a carboxyl component comprising a polycarboxylic acid compound, a derivative of polycarboxylic acid compound, or a combination thereof; and c. an alkyl acetoacetate, a diketene, or a combination thereof in an amount ranging from about 5 to about 50 weight %, based on the total weight of (a), (b), and (c). II. a curing agent having two or more aldehyde functional groups, and III. a basic catalyst.

15 Claims, No Drawings

(56) References Cited

U.S. PATENT DOCUMENTS

| | | |
|---|---|---|
| 11,447,670 B2 | 9/2022 | Kuo et al. |
| 11,459,493 B2 | 10/2022 | Carvagno et al. |
| 11,530,342 B2 | 12/2022 | Dougherty et al. |
| 11,732,165 B2 | 8/2023 | Kuo et al. |
| 11,820,923 B2 | 11/2023 | Dougherty et al. |
| 2002/0040093 A1 | 4/2002 | Hobel et al. |
| 2002/0161162 A1 | 10/2002 | Kumar et al. |
| 2003/0060655 A1 | 3/2003 | Hayashi et al. |
| 2003/0195304 A1 | 10/2003 | Kuo et al. |
| 2003/0195305 A1 | 10/2003 | Kuo et al. |
| 2005/0081994 A1 | 4/2005 | Beckley et al. |
| 2007/0048337 A1 | 3/2007 | Arthur |
| 2008/0135059 A1* | 6/2008 | Germroth ............. A24D 3/08 131/202 |
| 2008/0135060 A1 | 6/2008 | Kuo et al. |
| 2009/0253865 A1 | 10/2009 | Shibutani et al. |
| 2010/0204401 A1 | 8/2010 | Marsh et al. |
| 2011/0015343 A1 | 1/2011 | Jones et al. |
| 2012/0220676 A1 | 8/2012 | Moens |
| 2013/0036939 A1 | 2/2013 | Webster et al. |
| 2013/0233739 A1 | 9/2013 | Zhao et al. |
| 2015/0024195 A1 | 1/2015 | Bammel et al. |
| 2015/0166828 A1* | 6/2015 | Anderson ........... C08G 16/0225 525/441 |
| 2016/0068707 A1 | 3/2016 | Drijfhout |
| 2016/0115345 A1 | 4/2016 | Kuo et al. |
| 2016/0115347 A1 | 4/2016 | Kuo et al. |
| 2016/0137877 A1* | 5/2016 | Kuo ................. C09D 167/02 524/539 |
| 2016/0297994 A1 | 10/2016 | Kuo et al. |
| 2017/0275492 A1 | 9/2017 | Zhou et al. |
| 2018/0163081 A1* | 6/2018 | Goedegebuure ........... C08J 3/24 |
| 2018/0251656 A1 | 9/2018 | Geodegebuure et al. |
| 2020/0140693 A1 | 5/2020 | Gessner et al. |
| 2020/0181311 A1 | 6/2020 | Carvagno et al. |
| 2020/0181312 A1 | 6/2020 | Dougherty et al. |
| 2020/0181324 A1 | 6/2020 | Dougherty et al. |
| 2020/0181338 A1 | 6/2020 | Collins et al. |
| 2020/0181395 A1 | 6/2020 | Dougherty et al. |
| 2020/0181465 A1 | 6/2020 | Kuo et al. |

FOREIGN PATENT DOCUMENTS

| | | | |
|---|---|---|---|
| EP | 0 687 716 A1 | 12/1995 | |
| EP | 1 435 383 A1 | 7/2004 | |
| EP | 3388486 A1 * | 10/2018 | ............. C08G 4/00 |
| GB | 1 154 725 A | 6/1969 | |
| JP | S56 5847 A | 1/1981 | |
| JP | 3284984 A | 12/1991 | |
| JP | H07331133 A | 12/1995 | |
| JP | H11310723 | 11/1999 | |
| JP | 3386577 A | 3/2003 | |
| WO | WO 96/41833 A1 | 12/1996 | |
| WO | WO-2016069572 A1 * | 5/2016 | ............. C08G 8/04 |
| WO | WO 2016/166369 A1 | 10/2016 | |
| WO | WO 2017/186899 A1 | 11/2017 | |
| WO | WO 2018/002538 A1 | 1/2018 | |
| WO | WO 2018/231601 A1 | 12/2018 | |
| WO | WO 2020/123278 A1 | 6/2020 | |

OTHER PUBLICATIONS

European Search Report Application No. 19895110.5 dated Sep. 16, 2022.
Co-pending U.S. Appl. No. 15/621,323, filed Jun. 13, 2017; Kuo et al.; now U. S. Pat. No. 10,563,040.
Office Action dated Feb. 25, 2019 received in co-pending U.S. Appl. No. 15/621,323.
Office Action dated Jul. 15, 2019 received in co-pending U.S. Appl. No. 15/621,323.
Notice of Allowance dated Oct. 24, 2019 received in co-pending U.S. Appl. No. 15/621,232.
Co-pending U.S. Appl. No. 17/309,121, filed Apr. 27, 2021; Kuo et al.
Co-pending U.S. Appl. No. 16/705,331, filed Dec. 6, 2019; now U. S. Publication No. 2020-0181465; Kuo et al.
Office Action dated Mar. 29, 2022 received in co-pending U.S. Appl. No. 16/705,331.
Co-pending U.S. Appl. No. 16/705,338, filed Dec. 6, 2019; now U. S. Publication No. 2020-0181311; Carvagno et al.
Office Action dated Mar. 17, 2022 received in co-pending U.S. Appl. No. 16/705,338.
Co-pending U.S. Appl. No. 16/705,345, filed Dec. 6, 2019; now U. S. Publication No. 2020-0181324; Dougherty et al.
Office Action dated Apr. 1, 2022 received in co-pending U.S. Appl. No. 16/705,345.
Co-pending U.S. Appl. No. 16/705,351, filed Dec. 6, 2019; now U. S. Publication No. 2020-0181395; Dougherty et al.
Office Action dated Feb. 22, 2022 received in co-pending U.S. Appl. No. 16/705,351.
Co-pending U.S. Appl. No. 16/705,365, filed Dec. 6, 2019; now U. S. Publication No. 2020-0181446; Boggs et al.
Non-Final Office Communication dated Jun. 9, 2021 received in U.S. Appl. No. 16/705,365.
Notice of Allowance and Fee(s) Due date of mailing Oct. 22, 2021 received in U.S. Appl. No. 16/705,365.
Co-pending U.S. Appl. No. 16/705,377, filed Dec. 6, 2019; now U. S. Publication No. 2020-0181312;Dougherty et al.
Office Action dated Mar. 17, 2022 received in co-pending U.S. Appl. No. 16/705,377.
Co-pending U.S. Appl. No. 16/705,394, filed Dec. 6, 2019; now U. S. Publication No. 2020-0181338; Collins et al.
Co-pending U.S. Appl. No. 16/705,324, filed Dec. 6, 2019; now U. S. Publication No. 2020-0109321; Kuo et al.
Office Action dated Jan. 7, 2022 received in U.S. Appl. No. 16/705,324.
Office Communication dated Jun. 14, 2021 received in U.S. Appl. No. 16/705,324.
ASTM D1003; Standard Test Method for Haze and Luminous Transmittance of Transparent Plastics; Nov. 2013.
ASTM D2578; Standard Test Method for Wetting Tension of Polyethylene and Polypropylene Films; Dec. 2017.
ASTM D3236; Standard Test Method for Apparent Viscosity of Hot Melt Adhesives and Coating Materials; Apr. 2015.
ASTM D3985; Standard Test Method for Oxygen Gas Transmission Rate Through Plastic Film and Sheeting Using a Coulometric Sensor; Nov. 2017.
ASTM D4366; Standard Test Method for Hardness of Organic Coatings by Pendulum Damping Tests; Dec. 2016.
ASTM D4752-10; Standard Practice for Measuring MEK Resistance of Ethyl Silicate (Inorganic) Zinc-Rich Primers by Solvent Rub; Feb. 2015.
ASTM D5402; Standard Practice for Assessing the Solvent Resistance of Organic Coatings Using Solvent Rubs; Jun. 2015.
ASTM D6493-11; Standard Test Methods for Softening Point of Hydrocarbon Resins and Rosin Based Resins by Automated Ring-and-Ball Apparatus; Dec. 2015.
ASTM D7253-16; Standard Test Method for Polyurethane Raw Materials: Determination of Acidity as Acid Number for Polyether Polyols; Sep. 2016.
ASTM D974; Standard Test Method for Acid and Base Number by Color-Indicator Titration; Dec. 2014.
ASTM E222-17; Standard Test Methods for Hydroxyl Groups Using Acetic Anhydride Acetylation; Jun. 2017.
ASTM F1249; Standard Test Method for Water Vapor Transmission Rate Through Plastic Film and Sheeting Using a Modulated Infrared Sensor; Oct. 2013.
ASTM F2622; Standard Test Method for Oxygen Gas Transmission Rate Through Plastic Film and Sheeting Using Various Sensors; Oct. 2013.
ASTM G155; Standard Practice for Operating Xenon Arc Light Apparatus for Exposure of Non-Metallic Materials; Jun. 2013.
Blank et al.; "Delayed (Latent) Catalysis in Coatings;" www.researchgate.net/publication/228420884.

(56) References Cited

OTHER PUBLICATIONS

Brinkhuis et al.; "Taming the Michael Addition reaction;" European Coatings Journal; 05; 2015; pp. 34-40.
Dow Coating Materials; "Advances in 2K ISO-Free[1] Urethane Coating Technology;" May 19, 2015; pp. 1-30.
Invitation to Pay Additional Fees with Date of Mailing Aug. 23, 2018 received in International Application No. PCT/US2018/036237.
Noomen; "Applications of Michael addition chemistry in coatings technology"; Progress in Organic Coatings; 32; (1997); pp. 137-142.
Notification of Transmittal of the International Search Report and the Written Opinion of the International Searching Authority with Date of Mailing Aug. 24, 2018 for International Application No. PCT/US2018/036244.
Notification of Transmittal of the International Search Report and the Written Opinion of the International Searching Authority with Date of Mailing Nov. 6, 2018 for International Application No. PCT/US2018/036237.
Notification of Transmittal of the International Search Report and the Written Opinion of the International Searching Authority with Date of Mailing Feb. 24, 2020 for International Application No. PCT/US2018/060816.
Notification of Transmittal of the International Search Report and the Written Opinion of the International Searching Authority with Date of Mailing Feb. 25, 2020 for International Application No. PCT/US19/64868.
Notification of Transmittal of the International Search Report and the Written Opinion of the International Searching Authority with Date of Mailing Apr. 7, 2020 for International Application No. PCT/US19/64870.
Notification of Transmittal of the International Search Report and the Written Opinion of the International Searching Authority with Date of Mailing Mar. 20, 2020 for International Application No. PCT/US2019/064872.
Notification of Transmittal of the International Search Report and the Written Opinion of the International Searching Authority with Date of Mailing Jun. 2, 2020 for International Application No. PCT/US2019/064876.
Notification of Transmittal of the International Search Report and the Written Opinion of the International Searching Authority with Date of Mailing Mar. 20, 2020 for International Application No. PCT/US2019/064878.
Notification of Transmittal of the International Search Report and the Written Opinion of the International Searching Authority with Date of Mailing Mar. 20, 2020 for International Application No. PCT/US2019/064883.
Notification of Transmittal of the International Search Report and the Written Opinion of the International Searching Authority with Date of Mailing Mar. 20, 2020 for International Application No. PCT/US2019/064893.
"Photogenerated Base in Polymer Curing & Imaging: Radiation-induce Crosslinking via a Knoevenagel Reaction" authored by Urankar et al. and published in Polymer Preprints (1994) 35, 933-934.
Wicks et al.; "Chapter 13—Polyester Resins"; Organic Coatings Science and Technology; 2nd ed.; pp. 246-257; Wiley, New York, 1999.
Witzeman et al.; "Comparison of Methods for the Preparation of Acetoacetylated Coating Resins"; Journal of Coatings Technology; vol. 62; No. 789; pp. 101-112 (1990).
Yamamoto et al.; "Iridium-Catalyzed Oxidative Methyl Esterification of Primary Alcohols and Diols with Methanol;" Journal of Organic Chemistry; vol. 76; No. 8; Apr. 15, 2011; pp. 2937-2941.
Notice of Allowance dated Aug. 3, 2022 received in co-pending U.S. Appl. No. 16/705,331.
Notice of Allowance dated Aug. 23, 2022 received in co-pending U.S. Appl. No. 16/704,338.
Office Action dated Aug. 22, 2022 received in co-pending U.S. Appl. No. 16/705,345.
USPTO Office Action dated Jun. 9, 2022 received in co-pending U.S. Appl. No. 16/705,394.
USPTO Office Action dated Feb. 15, 2023 received in co-pending U.S. Appl. No. 16/705,394.
USPTO Office Action dated May 11, 2022 received in co-pending U.S. Appl. No. 16/705,324.
USPTO Office Action dated Oct. 20, 2022 received in co-pending U.S. Appl. No. 16/705,324.

\* cited by examiner

CURABLE COATING COMPOSITIONS

FIELD OF THE INVENTION

This invention relates to coating compositions comprising acetoacetate functional polyesters and compounds having aldehyde functionality curable at low temperatures to form higher molecular weight networks. In one embodiment, these coating compositions based on such polyesters and aldehyde compounds can be suitable for low-temperature curing coating applications without the use of isocyanates.

BACKGROUND OF THE INVENTION

Thermosetting compositions based on isocyanate cross-linkers are widely used for coating and adhesive applications. Such systems are curable at room temperature or low temperatures (e.g. <80° C.) and are capable of providing the desirable properties for a variety of applications.

However, there have been increasing health concerns associated with the production and the use of isocyanate compounds and the formulations based on isocyanates. Thus, there is a need for a crosslinking system that is isocyanate free. Further, it is desirable the system not generate by-products upon curing, which can be detrimental to film formation or other desirable properties. Isocyanate crosslinkers are generally used for low-temperature curing. New commercially viable systems that can target replacement of isocyanate systems would preferably be curable at a wide range of temperatures, e.g., including ambient temperatures. This is particularly challenging because organic reactions generally require the use of heat to overcome the energy that is needed for the reactions to occur.

Thus, there is a need in the art for curable coating compostions that is isocyanate free, curable at a wide range of temperatures including low temperatures, and is suitable for applications in coatings, such as automotive, industrial maintenance, and furniture.

SUMMARY OF THE INVENTION

This invention discloses a variety of coatings compositions based on beta-ketoester functional polyesters. The present invention addresses the need for properties in coatings compositions for one or more of the following desirable properties: isocyanate free, adequate cure time, e.g., curable at a wide range of temperatures including low and high temperatures, hydrolytic stability, thermal stability, solvent resistance, chemical resistance, weatherability, and reduced (volatile organic compounds) VOC.

For the ease of reference but not intending to be limiting in any way, certain aspects of this disclosure are numbered consecutively, as follows.

In aspect 1 of this invention, there is provided a curable coating composition comprising:
I. a polyester having two or more beta-ketoester groups or malonate groups,
II. a curing agent having two or more aldehyde functional groups, and
III. a basic catalyst.

In aspect 2 of this invention, there is provided the curable coating composition of aspect 1, wherein the polyester (I) is an acetoacetate functional polyester comprising the residues of a. a hydroxyl component comprising:
   i. a diol in an amount ranging from 10 to 100 mole %, based on the total moles of (i) and (ii) equaling 100 mole %; and
   ii. a polyol in an amount ranging from 0 to 90 mole %, based on the total moles of (i) and (ii) equaling 100 mole %;
b. a carboxyl component comprising a polycarboxylic acid compound, a derivative of polycarboxylic acid compound, or a combination thereof; and
c. an alkyl acetoacetate, a diketene, or a combination thereof in an amount ranging from about 5 to about 50 weight %, based on the total weight of (a), (b), and (c).

In aspect 3 of this invention, there is provided the curable coating composition of aspects 1 or 2, wherein the polyester (I) is an acetoacetate functional polyester comprising the residues of a. a hydroxyl component comprising:
   i. a diol in an amount ranging from 70 to 100 mole %, based on the total moles of (i) and (ii) equaling 100 mole %; and
   ii. a polyol in an amount ranging from 0 to 30 mole %, based on the total moles of (i) and (ii) equaling 100 mole %;
b. a carboxyl component comprising a polycarboxylic acid compound, a derivative of polycarboxylic acid compound, or a combination thereof; and
c. an alkyl acetoacetate, a diketene, or a combination thereof in an amount ranging from about 5 to about 50 weight %, based on the total weight of (a), (b), and (c).

In aspect 4 of this invention, there is provided a curable coating composition comprising the polyester of any one of aspect 2-3, wherein the diol component (a)(i) is in an amount ranging from about 85 to about 95 mole %.

In aspect 5 of this invention, there is provided a curable coating composition comprising the polyester of any one of aspects 2-4, wherein the polyol component is in an amount ranging from about 5 to about 15 mole %.

In aspect 6 of this invention, there is provided a curable coating composition comprising any one of aspects 2-5, wherein the alkyl acetoacetate is an amount ranging from about 15 to about 30 weight %.

In aspect 7 of this invention, there is provided a curable coating composition comprising any one of aspects 2-6, wherein the diol component (a)(i) is one or more selected from the group consisting of 2,2-dimethyl-1,3-propanediol (neopentyl glycol), 2-methyl-1,3-propanediol, 2-butyl-2-ethyl-1,3-propanediol, 1,4-butanediol, 1,6-hexanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2,2,4,4-tetramethylcyclobutane-1,3-diol, and polyethylene glycol.

In aspect 8 of this invention, there is provided a curable coating composition comprising any one of aspects 2-7, wherein the polyol component is selected from 1,1,1-trimethylol propane, 1,1,1-trimethylolethane, glycerin, and pentaerythritol.

In aspect 9 of this invention, there is provided a curable coating composition comprising any one of aspects 2-7, wherein the carboxyl component (b) is one or more selected from the group consisting of adipic acid, isophthalic acid (or dimethyl isophthalate), 1,4-cyclohexanedicarboxylic acid, 1,3-cyclohexanedicarboxylic acid, hexahydrophthalic anhydride, maleic anhydride, succinic anhydride, phthalic acid, and phthalic anhydride.

In aspect 10 of this invention, there is provided a curable coating composition comprising any one of aspects 2-9 wherein the alkyl acetoacetate is one or more selected from t-butyl acetoacetate, methyl acetoacetate, ethyl acetoacetate, n-propyl acetoacetate, isopropyl acetoacetate, and n-butyl acetoacetate.

In aspect 11 of this invention, there is provided a curable coating composition comprising any one of aspects 2-9, wherein the polyester (I) has a glass transition temperature (Tg) of about −20° C. to about 60° C.

In aspect 12 of this invention, there is provided a curable coating composition comprising any one of aspects 1-11, comprising one or more organic solvents selected from the group comprising ethyl acetate, butyl acetate, xylene, methyl amyl ketone, methyl ethyl ketone, and toluene.

In aspect 13 of this invention, there is provided a curable coating composition comprising any one of aspects 212 wherein the curing agent (II) is a dialdehyde.

In aspect 14 of this invention, there is provided a curable coating composition comprising any one of aspects 2-13 wherein the basic catalyst is one or more selected from the group consisting of 1,8-diazabicyclo-[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), 1,1,3,3-tetramethylguanidine (TMG), 1,4-diazabicyclo[2.2.2]octane (DABCO), triethylamine, N,N-dimethylethanolamine, ammonium hydroxide, triphenyl phosphine, and tributyl phosphine.

In aspect 15 of this invention, there is provided a curable coating composition comprising any one of aspects 2-14 wherein the basic catalyst is used in an amount ranging from 0.5 to 5 weight % based on the total weight of (I) and (II).

In aspect 16 of this invention, there is provided a curable coating composition comprising any one of aspects 2-15 wherein the acetoacetate functional polyester is all aliphatic.

In aspect 17 of this invention, there is provided a curable coating composition comprising any one of aspects 1-16 wherein the curing agent is selected from the group comprising 1,3-cyclohexanedicarboxaldehyde (1,3-CHDAL), 1,4-cyclohexanedicarboxaldehyde (1,4-CHDAL), mixtures of 1,3- and 1,4-CHDAL, 2,6-norbornanedicarboxaldehyde, 2,5-norbornanedicarboxaldehyde, cyclododecane-1,4,8-tricarbaldehyde, 3,(4-formylcyclohexyl)propanal and its isomers.

In aspect 18 of this invention, there is provided a curable coating composition comprising any one of aspects 1-17, wherein said polyester (I) is an acetoacetate functional polyester, the curing agent (II) is selected from 1,3-cyclohexanedicarboxaldehyde (1,3-CHDAL), 1,4-cyclohexanedicarboxaldehyde (1,4-CHDAL), and mixtures of 1,3- and 1,4-CHDAL, and the basic catalyst is one or more selected from the group consisting of 1,8-diazabicyclo-[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), 1,1,3,3-tetramethylguanidine (TMG), 1,4-diazabicyclo[2.2.2]octane (DABCO), triethylamine, N,N-dimethylethanolamine, ammonium hydroxide, triphenyl phosphine, and tributyl phosphine.

In aspect 19 of this invention, there is provided a curable coating composition comprising any one of aspects 2-18, wherein the equivalent ratio of the acetoacetate (AcAc) functionality in the polyester (I) and the aldehyde (CHO) functionality in the crosslinking agent (II) is from about 0.25 to about 4, or from about 1.2 to about 0.9, or from about 1.05 to about 1.0, or from about 1.1 to about 0.95(AcAc/CHO).

In aspect 20 of this invention, there is provided a curable coating composition of any one of aspects 2-19 comprising an adduct having two or more β-ketoacetate functional groups selected from 2-methyl-1,3-propanediol diacetoacetate, neopentyl glycol diacetoacetate, 2,2,4,4-tetramethylcyclobutane-1,3-diacetoacetate, and trimethylolpropane triacetoacetate.

In aspect 21 of this invention, there is provided a composition of any one of aspects 1-20 comprising at least one solvent.

In aspect 22 of this invention, there is provided a composition of any one of aspect 1-21, wherein the composition is solventless or solvent free.

In aspect 23 of this invention, there is provided the composition of any of aspects 1-22 wherein the composition is substantially free of solvent or comprises essentially no solvent.

In aspect 24 of this invention, there is provided the composition of aspect 21 wherein the solvent borne composition comprises organic solvents.

In aspect 25 of this invention, there is provided a composition of aspect 24 comprising one or more organic solvents selected from the group comprising ethyl acetate, butyl acetate, xylene, methyl amyl ketone, methyl ethyl ketone, and toluene.

In aspect 26 of this invention, there is provided the composition of aspect 21 which does not contain solvents or residues of solvents such as ethylene glycol and/or ether-containing compounds, for example, dimethyl ether, ethylene glycol diethyl ether, diethylene glycol dimethyl ether, diethylene glycol diethyl ether.

In aspect 27 of this invention, there is provided the composition of any of aspects 1-26 wherein the composition can be water-free, and/or moisture-free, and/or can comprise substantially no water, and/or can contain essentially no water, or can contain one of the following weight percentages of water: 0 to 20 weight %, 0 to 19 weight %, 0 to 18 weight %, 0 to 17 weight %, 0 to 16 weight %, 0 to 15 weight %, 0 to 14 weight %, 0 to 13 weight %, 0 to 12 weight %, 0 to 11 weight %, 0 to 10 weight %, or 0 to 9 weight %, or 0 to 8 weight %, or 0 to 7 weight %, or 0 to 6 weight %, or 0 to 5 weight %, or 0 to 4 weight %, or 0 to 3 weight %, or 0 to 2 weight %, or 0 to 1 weight %, or contains 0.01 to 20 weight %, 0.01 to 19 weight %, 0.01 to 18 weight %, 0.01 to 17 weight %, 0.01 to 16 weight %, 0.01 to 15 weight %, 0.01 to 14 weight %, 0.01 to 13 weight %, 0.01 to 12 weight %, 0.01 to 11 weight %, 0.01 to 10 weight %, or 0.01 to 9 weight %, or 0.01 to 8 weight %, or 0.01 to 7 weight %, or 0.01 to 6 weight %, or 0.01 to 5 weight %, or 0.01 to 4 weight %, or 0.01 to 3 weight %, or 0.01 to 2 weight %, or 0.01 to 1 weight %, based on the total weight of the composition.

In aspect 28 of this invention, there is provided the composition of any of aspects 1-26 wherein the composition is not a water-borne or a water-dispersible composition.

In aspect 29 of this invention, there is provided the composition of any of aspects 1-28 wherein the composition does not contain: a polyvinyl alcohol, or a polyvinyl polymer, or residues of unsaturated vinyl moieties.

In aspect 30 of this invention, there is provided the composition of any of aspects 1-29 wherein the composition does not contain neutralizing agents.

In aspect 31 of this invention, there is provided the composition of any of aspects 2-30 wherein diol component (a)(i) contains only oxygen, carbon, and hydrogen.

In aspect 32 of this invention, there is provided a composition of any of aspects 2-31 wherein diol component (a)(i) does not have any carbonyl groups (—CO—).

In aspect 33 of this invention, there is provided a composition of any of aspects 1-32 which upon curing releases essentially no volatile organic compounds; or no VOCs; or less than 5 weight %, less than 4 weight %, less than 3 weight %, less than 2 weight %, or less than 1 weight % VOCs based on the total weight of the composition.

In aspect 34 of this invention, there is provided a composition of any of aspects 1-33 invention wherein monoaldehydes are excluded from the scope of this invention.

In aspect 35 of this invention, there is provided a composition of any of aspects 2-34 wherein diol component (a)(i) does not contain ether groups.

In aspect 36 of this invention, there is provided a composition of any of aspects 1-35 which is not a water-dispersible polyester microgel composition.

In aspect 37 of this invention, there is provided a curable coating composition of any one of aspects 1-36 which is applied to a substrate to form a coating film.

In aspect 38 of this invention, there is provided a curable coating composition of aspect 37 of the invention wherein at least one substrate can be selected from metals such as aluminum, steel or galvanized sheeting; glass; urethane elastomers; primed (painted) substrates; wood; paper; polymer films such as polyethylene, polypropylene, and polyethylene terephthalate (PET).

In aspect 39 of this invention, there is provided a curable coating composition wherein the curing agent is selected from the group consisting of 13-cyclohexanedicarboxaldehyde (1,3-CHDAL), 1,4-cyclohexanedicarboxaldehyde (1,4-CHDAL), mixtures of 1,3- and 1,4-CHDAL, 2,6-norbornanedicarboxaldehyde, 2,5-norbornanedicarboxaldehyde, cyclododecane-1,4,8-tricarbaldehyde, 3,(4-formylcyclohexyl)propanal and its isomers; cyclopentane-1,3-dicarbaldehyde, glutaraldehyde; tricyclodecane dialdehyde (TCDDAL); o-phthalaldehyde; terephthalaldehyde (TPAL); isophthalaldehyde; cyclopentane-1,3-dicarbaldehyde; cyclopenta-3,5-diene-1,3-dicarbaldehyde; glutaraldehyde; methylfurfural; furfural; or 5-(hydroxymethyl)furan-2-carbaldehyde; benzenedipropanal; or any isomers thereof; or mixtures thereof.

Unpredictably, the curable coating compositions of this invention can have one or more of the following desirable properties: isocyanate free, adequate cure time, e.g., curable at a wide range of temperatures including low and high temperatures, hydrolytic stability, thermal stability, solvent resistance, chemical resistance, weatherability, and reduced (volatile organic compounds) VOC.

DETAILED DESCRIPTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

It is believed that certain coatings of the invention have one or more of the following desirable properties: can have one or more of the following desirable properties: isocyanate free, adequate cure time, e.g., curable at a wide range of temperatures including low and high temperatures, hydrolytic stability, thermal stability, weatherability, solvent resistance, chemical resistance, and reduced (volatile organic compounds) VOC.

Unless otherwise indicated, all numbers expressing quantities of ingredients, properties such as molecular weight, reaction conditions, and so forth used in the specification and claims are to be understood as being modified in all instances by the term "about." Unless indicated to the contrary, the numerical parameters set forth in the following specification and attached claims are approximations that may vary depending upon the desired properties sought to be obtained by the present invention. At the very least, each numerical parameter should be construed in light of the number of reported significant digits and by applying ordinary rounding techniques. Further, the ranges stated in this disclosure and the claims are intended to include the entire range specifications and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in its respective testing measurements.

As used in the specification and the appended claims, the singular forms "a," "an" and "the" include their plural referents unless the context clearly dictates otherwise. For example, a reference to a "polyester," a "dicarboxylic acid", a "residue" is synonymous with "at least one" or "one or more" polyesters, dicarboxylic acids, or residues and is thus intended to refer to both a single or plurality of polyesters, dicarboxylic acids, or residues. In addition, references to a composition containing or including "an" ingredient or "a" polyester is intended to include other ingredients or other polyesters, respectively, in addition to the one named. The terms "containing" or "including" are intended to be synonymous with the term "comprising", meaning that at least the named compound, element, particle, or method step, etc., is present in the composition or article or method, but does not exclude the presence of other compounds, catalysts, materials, particles, method steps, etc., even if the other such compounds, material, particles, method steps, etc., have the same function as what is named, unless expressly excluded in the claims.

Also, it is to be understood that the mention of one or more process steps does not preclude the presence of additional process steps before or after the combined recited steps or intervening process steps between those steps expressly identified.

The present inventors have discovered that polyesters having moieties containing activated methylene or methine groups, such as those of beta-ketoesters, are curable with compounds having aldehyde functionality at low temperatures to form crosslinked networks. Formulations based on such polyesters and aldehyde compounds are especially suitable for low-temperature curing coating applications without the use of isocyanates.

Thus, in one embodiment, this invention provides a curable coating composition comprising:
  I. a polyester having two or more beta-ketoester groups,
  II. a crosslinking agent having two or more aldehyde functional groups, and
  III. a basic catalyst.

Said beta-ketoester groups are represented by Formula 1, wherein R is a branched or straight chain, saturated or unsaturated alkyl, alicyclic, or aromatic group; R' is a hydrogen or a branched or straight chain, saturated or unsaturated alkyl, alicyclic, or aromatic group.

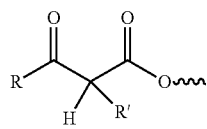

In one embodiment, the equivalent ratio of the ketoester functionality in the polyester and the aldehyde functionality in the crosslinking agent (i.e. eq. of ketoester/eq. of aldehyde) is from about 1.2 to about 0.9, or from about 1.1 to about 0.95, or from about 1.05 to about 1.0. Said equivalent ratio ($R_{eq}$) is defined by the equation: $R_{eq}$=eq. of ketoester/eq. of aldehyde. The eq. of ketoester is determined from the hydroxyl number ($n_{OH}$ mgKOH/g) that is used to calculate the amount of the ketoester reagent (e.g. t-butyl acetoacetate (tBAA) required to generate the ketoester functional groups as expressed by the ketoester (e.g. acetoacetate) number (AcAc number, $n_{AcAc}$ mgKOH/g), wherein $n_{OH}$=$n_{AcAc}$.

For example, if an AcAc polyester is obtained by converting 100 hydroxyl number to 100 AcAc number, the eq. of acetoacetate ($n_1$)=(100×wt. of the AcAc polyester in grams)/56100. The eq. of a dialdehyde ($n_2$)=wt. of the dialdehyde in grams/molar mass of the dialdehyde in g/mole×2. Said $R_{eq}$=eq. of acetoacetate/eq. of aldehyde=$n_1$/$n_2$.

It should be noted that the analyzed AcAc number may be deviated from the projected value. A titration method has been used to analyze the AcAc numbers of several synthesized polyesters and determine to be about 85-90 mgKOH/g vs. projected 100 mgKOH/g. That is $n_{AcAc}$<$n_{OH}$. However, in order to be consistent, $n_{OH}$ is used to calculate Req in this disclosure, assuming $n_{OH}$=$n_{AcAc}$.

Said polyester (I) contains two or more beta-ketoester groups, represented by Formula 2, wherein Z is a polyester residue, n represents the average number of beta-ketoester groups per polymer chain and is an average of at least 2. In one embodiment, the beta-ketoester group is acetoacetate (AcAc), and the polyester is an acetoacetate-functional polyester.

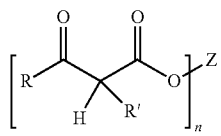

The acetoacetate-functional polyester may be prepared by reacting a polyester resin containing hydroxyl groups, for example, a polyester having a hydroxyl number of at least 5, for example, about 30 to 200, with diketene or a compound having the beta-ketoacetate moiety such as t-butylacetoacetate (tBAA). Various methods for the preparation of acetoacetylated polyester coating resins have been described by Witzeman et al. in the Journal of Coatings Technology, Vol. 62, No. 789, pp. 101-112 (1990). Suitable amounts of each in a reaction mixture include from about 50 to about 95, 60 to 90, 65 to 85, or 70 to 80 weight. % of the polyester resin and from about 5 to about 50, 10 to 40, 15 to 35, or 20 to 30 weight. % of the compound having a beta-ketoacetate moiety or a diketene can be reacted together, wherein the weight percents are based on the total weight of the polyester resin and the compound having the beta-ketoacetate moiety.

In one embodiment, the crosslinking agent (II) is a small molecule or an adduct having two or more aldehyde functional groups.

In one embodiment of the invention, there are provided compositions which do not contain compounds containing polysaccharide groups and/or oxidized polysaccharides having aldehyde functional groups.

In one embodiment of the invention, aldehydes include 13-cyclohexanedicarboxaldehyde (1,3-CHDAL), 1,4-cyclohexanedicarboxaldehyde (1,4-CHDAL), mixtures of 1,3- and 1,4-CHDAL (Formula 3) such as Paraloid Edge XL-195 available from The Dow Chemical Company, Midland, Mich.,

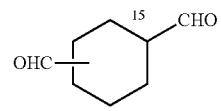

2,6-norbornanedicarboxaldehyde, 2,5-norbornanedicarboxaldehyde, cyclododecane-1,4,8-tricarbaldehyde, 3,(4-formylcyclohexyl)propanal and its isomers; cyclopentane-1,3-dicarbaldehyde, glutaraldehyde; tricyclodecane dialdehyde (TCDDAL); o-phthalaldehyde; terephthalaldehyde (TPAL); isophthalaldehyde; cyclopentane-1,3-dicarbaldehyde; cyclopenta-3,5-diene-1,3-dicarbaldehyde; glutaraldehyde; methylfurfural; furfural; or 5-(hydroxymethyl)furan-2-carbaldehyde; benzenedipropanal; or any isomers thereof; or mixtures thereof.

In one embodiment of the invention, the aldehyde useful in the invention can be selected from at least one of 1,3-cyclohexanedicarboxaldehyde (1,3-CHDAL); 1,4-cyclohexanedicarboxaldehyde (1,4-CHDAL); mixtures of 1,3- and 1,4-CHDAL, such as Paraloid Edge XL-195 available from The Dow Chemical Company; 2,6-norbornanedicarboxaldehyde; terephthalaldehyde, isophthalaldehyde, orthophthalaldehyde, cyclopenta-3,5-diene-1,3-dicarbaldehyde and tricyclodecane dialdehyde, or any isomers thereof or any combinations thereof.

In one embodiment of the invention, the aldehyde useful in the invention can be selected from at least one of mixtures of 1,3- and 1,4-CHDAL, terephthalaldehyde, orthophthaladehyde, and tricyclodecane dialdehyde, or any isomers thereof or any combinations thereof.

Said multi-functional aldehyde compounds may be blocked to improve storage stability and/or extend the open time for application of the curable coating composition of the invention. The aldehyde may be reacted with a diol such as ethylene glycol to form a dioxolane, with an amine to form an imine, with hydroxylamine to form an oxime, or with sodium bisulfite to form a sulfonate salt. The resulting blocked aldehydes may be de-blocked by changing the pH or heating. The techniques for blocking and de-blocking of a polyaldehyde have been disclosed in U.S. Pat. No. 6,177,514.

In another embodiment, the acetoacetate functional polyester comprises the reaction product (or residues) of (a) from about 50 to about 95 weight percent of a hydroxyl functional polyester and (b) from about 5 to about 50 weight percent of an alkyl acetoacetate or diketene, wherein the weight percents are based on the total weight of (a) and (b) equaling 100 weight %. The weight % of (a) may be 50 to about 95, 60 to 90, 65 to 85, or 70 to 80 and the weight % (b) may be 5 to about 50, 10 to 40, 15 to 35, or 20 to 30 based on the total weight of (a) (the polyester resin) and (b) (the compound having the beta-ketoacetate moiety) equaling 100 weight %.

The hydroxyl number of the polyester resin used to make the curable polyester resin can be within a range of from greater than 0 to 300 mg KOH/g. Suitable ranges of hydroxyl number include greater than 0 to 300, or from 10 to 300, or from 30 to 300, or from 50 to 300, or from 60 to 300, or from 80 to 300, or from 100 to 300, or from 120 to 300, or from 140 to 300, or from 160 to 300, or from 180 to 300, or greater than 0 to 250, or from 10 to 250, or from 30 to 250, or from 50 to 250, or from 60 to 250, or from 80 to 250, or from 100 to 250, or from 120 to 250, or from 140 to 250, or from 160 to 250, or from 180 to 250, greater than 0 to 240, or from 10 to 240, or from 30 to 240, or from 50 to 240, or from 60 to 240, or from 80 to 240, or from 100 to 240, or from 120 to 240, or from 140 to 240, or from 160 to 240, or from 180 to 240, or greater than 0 to 220, or from 10 to 220, or from 30 to 220, or from 50 to 220, or from 60 to 220, or from 80 to 220, or from 100 to 220, or from 120 to 220, or from 140 to 220, or from 160 to 220, or from 180 to 220 or greater than 0 to 200, or from 10 to 200, or from 30 to 200, or from 50 to 200, or from 60 to 200, or from 80 to 200, or from 100 to 200, or from 120 to 200, or from 140 to 200, or from 160 to 200, or from 180 to 200 or greater than 0 to 180, or from 10 to 180, or from 30 to 180, or from 50 to 180, or from 60 to 180, or from 80 to 180, or from 100 to 180, or from 120 to 180, or from 140 to 180, or from 160 to 180, or from 0 to 160, or from 10 to 160, or from 30 to 160, or from 50 to 160, or from 60 to 160, or from 80 to 160, or from 100 to 160, or from 120 to 160, or from 140 to 160 or from 0 to 150, or from 10 to 150, or from 30 to 150, or from 50 to 150, or from 60 to 150, or from 70 to 150, or from 80 to 150, or from 100 to 150, or from 120 to 150, or from 130 to 150 mg KOH/g.

In one embodiment, the composition of the invention or the polyester resin of the invention has an acid number of 0 to 15 or less than 15 mg KOH/g with and/or without neutralizing agents.

In one embodiment, acid number(s) of the compositions of the invention or of the polyester resin of the invention can be from 0 to about 14, or from 0 to about 13, or from 0 to about 12, or from 0 to about 11, or from 0 to about 10, or from 0.01 to about 15, or from 0.01 to about 14, or from 0.01 to about 13, or from 0.01 to about 12, or from 0.01 to about 11, or from about 0.01 to about 10; or from 0.50 to about 15, or from 0.50 to about 14, or from 0.50 to about 13, or from 0.50 to about 12, or from 0.50 to about 11, or from 0.50 to about 10 mg KOH/g, with or without addition of neutralizing agents.

Acid number is determined by the titration method in accordance with ASTM D974. Hydroxyl number is measured using a procedure based on ASTM E222-17 entitled "Standard Test Methods for Hydroxyl Groups Using Acetic Anhydride."

In one embodiment, low acid numbers for the polyesters can be desirable since the reactive composition of the invention requires the use of a base catalyst. Higher acid numbers can deactivate the base catalyst.

The hydroxyl number of the polyester of the present invention can be at least 5, or from about 10 to about 200, or from about 10 to about 300, or from about 30 to about 300, or from about 30 to about 200, or from about 30 to about 180, or from about 50 to about 150 mgKOH/g. For certain embodiments, the acid number of the hydroxyl functional polyester can be from 0 to about 30, from 0 to about 15, from 0 to about 10, from 0 to 5 mg KOH/g, from about 3 to about 25, from 5 to about 15, or from 8 to about 12 mgKOH/g. For other embodiments, for example, waterborne applications, the acid number may be from about 30 to about 120 or from about 50 to about 100 mgKOH/g. Acid number is determined by the titration method in accordance with ASTM D974. Hydroxyl number is determined by using a procedure based on ASTM E222-17 entitled "Standard Test Methods for Hydroxyl Groups Using Acetic Anhydride." Low acid numbers can be desirable since the curable coating composition of the invention requires the use of a base catalyst. Higher acid numbers can deactivate the base catalyst.

The glass transition temperature (Tg) of the acetoacetate-functional polyester of the present invention may be from −40° C. to 80° C., or from −30° C. to 80° C., or from −30° C. to 70° C., or from −20° C. to 80° C., or from −20° C. to 70° C., or from −20° C. to 60° C.

The weight average molecular weight (Mw) of the acetoacetate functional polyester of the present invention may be from 1,000 to 100,000; from 1,500 to 50,000; from 2,000 to 10,000; or from 2,500 to 5,000 g/mole. The polyester may be linear or branched. The Mw is measured by gel permeation chromatography (GPC) using polystyrene equivalent molecular weight.

The hydroxyl functional polyester that is used to prepare acetoacetate polyester is typically synthesized by reacting a hydroxyl compound, for example, a diol or trial, with a carboxyl compound, for example, a dicarboxylic acid. Examples of hydroxyl compounds include diols such as 2,2,4,4-tetraalkylcyclobutane-1,3-diol (TACD), 2,2-dimethyl-1,3-propanediol (neopentyl glycol), 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2-methyl-1,3-propanediol, 2-butyl-2-ethyl-1,3-propanediol, 2-ethyl-2-isobutyl-1,3-propanediol, 1,3-butanediol, 1,4-butanediol, 1,5-pentanediol, 1,6-hexanediol, 2,2,4,4-tetramethyl-1,6-hexanediol, 1,10-decanediol, 1,4-benzenedimethanol, hydrogenated bisphenol A, ethylene glycol, propylene glycol, diethylene glycol, dipropylene glycol, triethylene glycol, tetraethylene glycol, and polyethylene glycol, and polyols such as 1,1,1-trimethylol propane, 1,1,1-trimethylolethane, glycerin, pentaerythritol, erythritol, threitol, dipentaerythritol, sorbitol, and the like.

Examples of said 2,2,4,4-tetraalkylcyclobutane-1,3-diols (TACD) include 2,2,4,4-tetramethylcyclobutane-1,3-diol (TMCD), 2,2,4,4-tetraethylcyclobutane-1,3-diol, 2,2,4,4-tetra-n-propylcyclobutane-1,3-diol, and 2,2,4,4-tetra-n-butylcyclobutane-1,3-diol.

The carboxyl compound may be a polycarboxylic acid compound, a derivative of polycarboxylic acid compound, or a combination thereof. Suitable polycarboxylic acid compounds include compounds having at least two carboxylic acid groups. In one embodiment the polycarboxylic acid compound comprises a dicaraboxylic acid compound having two carboxylic acid groups, derivatives thereof, or combinations thereof, capable of forming an ester linkage with a polyhydroxyl component. For example, a polyester can be synthesized by using a polyhydroxyl compound and a derivative of a dicarboxylic acid such as, for example, dimethyl ester or other dialkyl esters of the diacid, or diacid chloride or other diacid halides, or acid anhydride. In another embodiment, the polycarboxylic acid compound comprises a tricarboxylic acid or anhydride, for example, trimellitic acid or trimellitic anhydride.

Examples of dicarboxylic acids that may be used include aliphatic dicarboxylic acids, alicyclic dicarboxylic acids, aromatic dicarboxylic acids, derivatives of each, or mixtures of two or more of these acids. Thus, suitable dicarboxylic acids include, but are not limited to, isophthalic acid (or dimethyl isophthalate), terephthalic acid (or dimethyl terephthalate), phthalic acid, phthalic anhydride, 1,4-cyclohexane-dicarboxylic acid, 1,3-cyclohexanedicarboxylic acid, hexahydrophthalic anhydride, tetrahydrophthalic anhydride, tetrachlorophthalic anhydride, dodecanedioic acid, sebacic acid, azelaic acid, maleic acid or anhydride, fumaric acid, succinic anhydride, succinic acid, adipic acid, 2,6-naphthalenedicarboxylic acid, glutaric acid, itaconic acid, and their derivatives, diglycolic acid; 2,5-norbornanedicarboxylic acid; 1,4-naphthalenedicarboxylic acid; 2,5-naphthalenedicarboxylic acid; diphenic acid; 4,4'-oxydibenzoic acid; 4,4'-sulfonyidibenzoic acid, and mixtures thereof.

In one embodiment, the acetoacetate functional polyester comprises the residues of:
a. a hydroxyl component comprising:
  i. a diol in an amount ranging from 70 to 100 mole %, based on the total moles of (i) and (ii), and
  ii. a polyol in an amount ranging from 0 to 30 mole %, based on the total moles of (i) and (ii);
b. a carboxyl component comprising a polycarboxylic acid compound, a derivative of polycarboxylic acid compound, or a combination thereof; and
c. an alkyl acetoacetate, a diketene, or a combination thereof in an amount ranging from about 5 to about 50 weight %, based on the total weight of (a), (b), and (c) equaling 100 weight %.

The mole % of the diol component of (a)(i) can be 70 to 100, 80 to 97, or 85 to 95, and of the polyol of (a)(ii) can be 0 to 30, 3 to 20, or 5 to 15, based on the total moles of (a)(i) and (a)(ii) equaling 100 mole %. The weight % of the alkyl acetoacetate and/or diketene (c) can be from about 5 to about 50, 10 to 40, 15 to 35, or 20 to 30 weight %, based on the total weight of (a), (b), and (c) equaling 100 weight %).

In another embodiment, the acetoacetate functional polyester comprises the residues of:
a. a hydroxyl component comprising:
  i. a diol in an amount ranging from 85 to 95 mole %, based on the total moles of (i) and (ii), and
  ii. a polyol in an amount ranging from 5 to 15 mole %, based on the total moles of (i) and (ii);
b. a carboxyl component comprising a polycarboxylic acid compound, a derivative of polycarboxylic acid compound, or a combination thereof; and
c. an alkyl acetoacetate, a diketene, or a combination thereof in an amount ranging from about 15 to about 30 weight %, based on the total weight of (a), (b), and (c).

The diol (a)(i) can comprise one or more selected from the group consisting of 2,2-dimethyl-1,3-propanediol (neopentyl glycol), 2-methyl-1,3-propanediol, 2-butyl-2-ethyl-1,3-propanediol, 1,4-butanediol, 1,6-hexanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2,2,4,4-tetramethylcyclobutane-1,3-diol, and polyethylene glycol. In one embodiment, the polyol (a)(ii) can be selected from 1,1,1-trimethylol propane, 1,1,1-trimethylolethane, glycerin, and pentaerythritol.

In one embodiment, the carboxyl component (b) can comprise one or more selected from the group consisting of isophthalic acid (or dimethyl isophthalate), terephthalic acid (or dimethyl terephthalate), phthalic acid, phthalic anhydride, 1,4-cyclohexane-dicarboxylic acid, 1,3-cyclohexanedicarboxylic acid, adipic acid, 2,6-naphthalenedicarboxylic acid, 1,4-naphthalenedicarboxylic acid; 2,5-naphthalenedicarboxylic acid; hexahydrophthalic anhydride, tetrahydrophthalic anhydride, trimellitic anhydride, maleic acid or anhydride, fumaric acid, succinic anhydride, and succinic acid. In another embodiment, the carboxyl compound (b) is selected from the group consisting of adipic acid, isophthalic acid (or dimethyl isophthalate), 1,4-cyclohexanedicarboxylic acid, 1,3-cyclohexanedicarboxylic acid, hexahydrophthalic anhydride, maleic anhydride, succinic anhydride, phthalic acid, and phthalic anhydride.

In one embodiment, the AcAc polyester composition can comprise 2,2,4,4-tetramethylcyclobutane-1,3-diol (TMCD) and hexahydrophthalic anhydride (HHPA).

In another embodiment, the AcAc polyester composition can be all aliphatic for outdoor durability. Coatings formulated with all-aliphalic polyesters comprising TMCD and HHPA have been found to have excellent gloss retention under accelerated weathering test.

Thus, in another embodiment, the acetoacetate functional polyester comprises the residues of:
a. a hydroxyl component comprising:
  i. 2,2,4,4-tetramethylcyclobutane-1,3-diol (TMCD) in an amount ranging from 10 to 60 mole %, based on the total moles of (i), (ii), and (iii);
  ii. a diol other than TMCD in an amount ranging from 35 to 85 mole %, based on the total moles of (i), (ii), and (iii); and
  iii. a polyol in an amount ranging from 5 to 15 mole %, based on the total moles of (i), (ii), and (iii);
b. a carboxyl component comprising:
  i. hexahydrophthalic anhydride (HHPA) in an amount ranging from 50 to 100 mole % based on the total moles of (i) and (ii), and
  ii. a polycarboxylic acid compound other than HHPA in an amount ranging from 0 to 50 mole % based on the total moles of (i) and (ii); and
c. an alkyl acetoacetate, a diketene, or a combination thereof in an amount ranging from about 15 to about 30 weight %, based on the total weight of (a), (b), and (c).

Examples of said alkyl acetoacetate (c) include t-butyl acetoacetate, methyl acetoacetate, ethyl acetoacetate, n-propyl acetoacetate, isopropyl acetoacetate, n-butyl acetoacetate, and the like.

The curable coating composition of the present invention further comprises a base catalyst (III) in an amount ranging from 0.1 to 10, 0.2 to 7, 0.3 to 6, or 0.5 to 5 weight %, based on the total weight of the first component (I) and the second component (II).

Examples of the base catalyst include amidine type, such as 1,8-diazabicyclo-[5.4.0]undec-7-ene (DBU), 1,5-diazabicyclo[4.3.0]non-5-ene (DBN), 1,5,7-triazabicyclo[4.4.0]dec-5-ene (TBD), 7-methyl-1,5,7-triazabicyclo[4.4.0]dec-5-ene (MTBD), and 1,1,3,3-tetramethylguanidine (TMG), bicyclic unhindered tertiary amine type such as 1,4-diazabicyclo[2.2.2]octane (DABCO), tertiary amine type such as triethylamine and N,N-dimethylethanolamine, quaternary ammonium compounds such as ammonium hydroxide and tetrabutyl ammonium hydroxide, phosphine type such as triphenyl phosphine and tributyl phosphine, and inorganic bases such as sodium hydroxide and potassium hydroxide, and mixtures thereof. In one embodiment, the catalyst can be selected from the amidine type, the bicyclic unhindered tertiary amine type, and the tertiary amine type. In another embodiment, the catalyst can be the amidine type, for example, 1,8-diazabicyclo-[5.4.0]undec-7-ene (DBU), 1,5-diazabicyclo[4.3.0]non-5-ene (DBN), 1,5,7-triazabicyclo

[4.4.0]dec-5-ene (TBD), 7-methyl-1,5,7-triazabicyclo [4.4.0]dec-5-ene (MTBD), and 1,1,3,3-tetramethylguanidine (TMG).

In order to extend the pot life of the curable coating composition of the invention, the base catalyst (III) may be temporarily blocked. For example, an alcohol such as methanol, ethanol, n-propanol, isopropanol may be added to the composition on storage to block the catalyst. When the composition is applied, the alcohol will evaporate and the catalyst de-blocked. A carboxylic acid, such as benzoic acid, acetic acid, formic acid, or cyanoacetic acid, can also be added to the composition to block the catalyst and subsequently deblock by heating. Such techniques for blocking and deblocking the amidine catalysts have been disclosed in Progress in Organic Coatings, 32 (1997), 137-142 by Arie Noomen.

Moreover, the present inventors have found that methanol is surprisingly much more effective in blocking the basic catalyst such as DBU. Solvent-borne coatings formulated with DBU in methanol (e.g. 25% by weight) have been found to remain fluid over time and have significantly less viscosity increase than those formulated with DBU in n-propanol or ethanol.

Thus, in a further embodiment, the curable coating composition of the present invention further comprises a catalyst-blocking agent. Examples of such blocking agents include alcohols, such as methanol, ethanol, isopropanol, n-propanol, and the like, and carboxylic acids such as benzoic acid, formic acid, acetic acid, and cyanoacetic acid. Methanol is most desirable.

In still another embodiment, this invention provides a curable coating composition comprising an acetoacetate functional polyester and one or more dialdehydes selected from 1,3-cyclohexanedicarboxaldehyde (1,3-CHDAL), 1,4-cyclohexane-dicarboxaldehyde (1,4-CHDAL), and mixtures of 1,3- and 1,4-CHDAL. In one embodiment, the equivalent ratio of the acetoacetate functionality and the aldehyde (CHO) functionality (i.e. eq. ratio of AcAc/CHO) is from about 1.2 to about 0.9, or from about 1.1 to about 0.95, or from about 1.05 to about 1.0 (ratio of AcAc/CHO).

In yet another embodiment, the curable coating composition of the present invention further comprises one or more adducts having two or more β-ketoacetate functional groups such as, for example, 2-methyl-1,3-propanediol diacetoacetate, neopentyl glycol diacetoacetate, 2,2,4,4-tetramethyl-cyclobutane-1,3-diol diacetoacetate, and trimethylolpropane triacetoacetate, which are prepared from the corresponding diol or triol. The adducts can increase the functionality of the β-ketoacetate functional groups available for crosslinking and thus improve the curing of the coatings as evidenced by the increase of the solvent resistance of the coatings. The adducts also function as reactive diluents to reduce the viscosity of the coating formulations and to reduce the solvent content. The adducts may be used at a ratio ranging from about 3 to about 60 weight % based on the total weight of AcAc polyester and the adducts, desirably from about 10 to about 30%.

Coating formulations with high solids such as, for example greater than 50% solids, are desirable since they can reduce the volatile organic solvent content (VOC) and increase the worker productivity due to fewer coats are needed to obtain the desirable coating thickness. Thus, in another embodiment, this invention provides a curable coating composition having 50, 60, 70, 80, or 90% solids.

The curable coating composition of the invention is capable of reacting at an ambient temperature in the presence of a base catalyst. In a so-called 2K system, it is required to mix the two components shortly before use to prevent the composition from premature crosslinking and becoming useless. In the present invention, the mixing of the two components does not result in significant reactions in the absence of a catalyst. Thus, the polyester and the crosslinking agent may be mixed and stored until the mixture is ready to be used. The base catalyst can then be added shortly before use.

The curable coating composition of the invention may further comprise an organic solvent. Suitable organic solvents include ethyl acetate, butyl acetate, xylene, ketones (for example, methyl amyl ketone and methyl ethyl ketone), 2-butoxyethanol, ethyl-3-ethoxypropionate, toluene, butanol, cyclopentanone, cyclohexanone, and other volatile inert solvents typically used in coatings. The amount of solvents can range from 0% to 70%, 5% to 50%, or 10% to 30% based on the total weight of the coating formulation.

In one embodiment of this invention, the composition does not contain solvents or residues of solvents such as ethylene glycol and/or ether-containing compounds, for example, dimethyl ether, ethylene glycol diethyl ether, diethylene glycol dimethyl ether, diethylene glycol diethyl ether.

In one embodiment of this invention, the composition can be water-free, and/or moisture-free, and/or can comprise substantially no water, and/or can contain essentially no water, or can contain one of the following weight percentages of water: 0 to 20 weight %, 0 to 19 weight %, 0 to 18 weight %, 0 to 17 weight %, 0 to 16 weight %, 0 to 15 weight %, 0 to 14 weight %, 0 to 13 weight %, 0 to 12 weight %, 0 to 11 weight %, 0 to 10 weight %, or 0 to 9 weight %, or 0 to 8 weight %, or 0 to 7 weight %, or 0 to 6 weight %, or 0 to 5 weight %, or 0 to 4 weight %, or 0 to 3 weight %, or 0 to 2 weight %, or 0 to 1 weight %, or contains 0.01 to 20 weight %, 0.01 to 19 weight %, 0.01 to 18 weight %, 0.01 to 17 weight %, 0.01 to 16 weight %, 0.01 to 15 weight %, 0.01 to 14 weight %, 0.01 to 13 weight %, 0.01 to 12 weight %, 0.01 to 11 weight %, 0.01 to 10 weight %, or 0.01 to 9 weight %, or 0.01 to 8 weight %, or 0.01 to 7 weight %, or 0.01 to 6 weight %, or 0.01 to 5 weight %, or 0.01 to 4 weight %, or 0.01 to 3 weight %, or 0.01 to 2 weight %, or 0.01 to 1 weight %, based on the total weight of the composition.

In one embodiment of this invention, the composition of this invention is not a water-borne or a water-dispersible composition.

In one embodiment of this invention, the composition of this invention does not contain: a polyvinyl alcohol, or a polyvinyl polymer, or residues of unsaturated vinyl moieties.

In one embodiment of this invention, diol component (a)(i) of the composition contains only oxygen, carbon, and hydrogen.

In one embodiment of this invention, diol component (a)(i) does not have any carbonyl groups (—CO—).

In one embodiment of this invention, wherein upon curing, the composition of this invention releases essentially no volatile organic compounds, or no VOCs, or less than 5 weight %, or less than 4 weight %, or less than 3 weight %, or less than 2 weight %, or less than 1 weight % VOCs based on the total weight of the composition.

In one embodiment of this invention, monoaldehydes are excluded from the scope of this invention.

After formulation, the curable coating composition can be applied to a substrate to form a coating film. Examples of substrates include metals such as aluminum, steel or galvanized sheeting; glass; urethane elastomers; primed (painted)

substrates; wood; paper; polymer films such as polyethylene, polypropylene, and polyethylene terephthalate (PET).

The curable coating composition can be coated onto a substrate using techniques known in the art, for example, by spraying, draw-down, roll-coating, brushing, nozzle dispensing, printing, etc. The coating may be cured at room temperature or elevated temperatures.

The following examples further illustrate how the polyesters useful in the invention can be made and evaluated, and how the coatings can be made and evaluated, and are intended to be purely exemplary of the invention and are not intended to limit the scope thereof. Unless indicated otherwise, parts are parts by weight, temperature is in degrees C. (Celsius) or is at room temperature, and pressure is at or near atmospheric.

EXAMPLES

For the Examples herein, test methods and abbreviations are as follows:

Molecular weights are measured by gel permeation chromatography (GPC) using polystyrene equivalent molecular weight and is expressed in g/mole units The glass transition temperature (Tg) of the polyesters is determined using a TA DSC 2920.

Example 1. Synthesis of Acetoacetate Functional Polyester 1 (AcAc Polyester 1)

Hydroxyl Functional Polyester 1:

A 2-L kettle with a four-neck lid was equipped with a mechanical stirrer, a thermocouple, a heated partial condenser (115° C.), a Dean-Stark trap, and a chilled condenser (15° C.). To the flask were charged 2,2,4,4-tetramethyl-1,3-cyclobutanediol (TMCD, 300.3 g), hexahydrophthalic anhydride (539.6 g), and the acid catalyst, Fascat-4100 (Arkema Inc.) (1.68 g). The reaction was allowed to react under nitrogen at 190° C. for two hours and at 230° C. for two hours. To the reaction mixture were then added the second stage reactants-neopentyl glycol (216.9 g) and trimethylolpropane (65.75 g). The reaction was allowed to continue at 230° C. for 9 hours. A total of 60.2 g of the distillate was collected in the Dean-Stark trap. The resulting mixture was allowed to cool to room temperature and subsequently collected. Acid number: 2.0 mgKOH/g; hydroxyl number: 130 mgKOH/g; glass transition temperature (Tg): 28.8° C.; number average molecular weight (Mn): 1381 g/mole; weight average molecular weight (Mw): 2499 g/mole.

Acetoacetate(AcAc) Functional Polyester 1:

The next synthesis was aimed to convert hydroxyl number of 100 mgKOH/g of the above hydroxyl functional polyester (1) to acetoacetate number of 100 mgKOH/g. To the above hydroxyl-functional polyester 1 was added t-butyl acetoacetate (298.88 g). The mixture was gradually heated and allowed to react at 120° C. for 20 minutes and at 140° C. for two hours. A total of 121 g of the condensate (t-butanol) was collected in the Dean-Stark adapter. The resulting viscous resin was allowed to cool and subsequently collected. Glass transition temperature (Tg): −0.83° C.; number average molecular weight (Mn): 1479 g/mole; weight average molecular weight (Mw): 2653 g/mole.

Example 2. Synthesis of Acetoacetate Functional Polyester 2

In this example, a higher ratio (51 equivalent % based on the total equivalents of the hydroxyl components) of TMCD was used in the composition.

Hydroxyl Functional Polyester 2:

A 2-L kettle with a four-neck lid was equipped with a mechanical stirrer, a thermocouple, a heated partial condenser (115° C.), a Dean-Stark trap, and a chilled condenser (15° C.). To the flask were charged 2,2,4,4-tetramethyl-1,3-cyclobutanediol (TMCD, 360.4 g), hexahydrophthalic anhydride (539.6 g), and the acid catalyst, Fascat-4100 (Arkema Inc.) (1.71 g). The reaction was allowed to react under nitrogen at 190° C. for two hours and at 230° C. for two hours. To the reaction mixture were then added the second stage reactants-neopentyl glycol (173.5 g) and trimethylolpropane (65.75 g). The reaction was allowed to continue at 230° C. for 9 hours. A total of 61 g of the distillate was collected in the Dean-Stark trap. The resulting mixture was allowed to cool to room temperature and subsequently collected. Acid number: 1.0 mgKOH/g; hydroxyl number: 118.8 mgKOH/g; glass transition temperature (Tg): 35.5° C.; number average molecular weight (Mn): 1497 g/mole; weight average molecular weight (Mw): 2780 g/mole.

Acetoacetate Functional Polyester 2:

The next synthesis was aimed to convert hydroxyl number of 100 mgKOH/g of the above hydroxyl functional polyester (2) to acetoacetate number of 100 mgKOH/g. To a 500 mL, three-neck, round-bottom flask equipped with a mechanical stirrer, a heated partial condenser, a Dean-Stark trap, and a water condenser were added the above hydroxyl-functional polyester 2 (200.0 g) and t-butyl acetoacetate (56.33 g). The mixture was gradually heated and allowed to react at 120° C. for 20 minutes and at 140° C. for two hours. A total of 34 ml of the condensate (t-butanol) was collected in the Dean-Stark adapter. The resulting viscous resin was allowed to cool and subsequently collected. Glass transition temperature (Tg): 13.1° C.; number average molecular weight (Mn): 1634 g/mole; weight average molecular weight (Mw): 2919 g/mole.

Examples 3 (a) and (b). Formulation and Evaluation of Solvent-Borne Coating

Coating formulations were prepared by mixing AcAc (Acetoacetate) polyesters 1-2 (50%) in methyl amyl ketone (MAK) by weight) from Examples 1 and 2, respectively, with the crosslinker, a mixture of 1,3- and 1,4-cyclohexanedicarboxaldehyde (CHDAL) and the catalyst, 1,8-diazabicyclo-[5.4.0]undec-7-ene (DBU) in n-propanol (25 weight %). The formulations were formulated to have DBU (100%) at 4 weight % based on the total weight of the polyester (100%) and CHDAL as listed in Table 1. The resulting coating formulations were drawn down on cold-rolled steel test panels (thickness, about 10 μm). The coatings thus obtained were then allowed to cure at RT for one week. The curing was monitored by König Pendulum Hardness Tester (BYI-Gardner) (ASTM D4366). The results are listed in Table 2.

TABLE 1

Coating Compositions

| Example Number | AcAc Polyester Number | Polyester Solution (50 weight % in MAK), g | CHDAL | DBU in methanol (25%) | Catalyst Ratio (%) |
|---|---|---|---|---|---|
| 3(a) | 1-Example 1 | 10 | 0.62 | 0.9 | 4 |
| 3(b) | 2-Example 2 | 10 | 0.62 | 0.9 | 4 |

TABLE 2

Coating Properties of Compositions from Table 1

| | Formulation | Coating Properties (RT Drying) | | |
|---|---|---|---|---|
| Example Number | Observation After one week | After One Day | After one day (Pendulum Hardness) (sec.) | After 4 days (Pendulum Hardness) (sec.) |
| 3(a) | Yellow viscous liquid; flow well | Non tacky; glossy | 190 | 199 |
| 3(b) | Yellow viscous liquid; flow well | Non tacky; glossy | 182 | 201 |

Example 4. Synthesis of Acetoacetate Functional Polyester 3 (AcAc Polyester 3)

Hydroxyl Functional Polyester 3:

A hydroxyl functional polyester (3) with the composition of 2,2,4,4-tetramethyl-1,3-cyclobutanediol (18.5% equivalent ratio based on the total OH equivalents), neopentyl glycol (35.4% equivalent ratio based on the total OH equivalents), trimethylolpropane (46.1% equivalent ratio based on the total OH equivalents), and hexahydrophthalic anhydride was prepared similarly as described in Example 1. The polyester had the properties of: acid number 5 mgKOH/g, hydroxyl number 162 mgKOH/g, and Tg 37° C.

Acetoacetate Functional Polyester 3

The next synthesis was aimed to convert hydroxyl number of 100 mgKOH/g of the above hydroxyl functional polyester (3) to acetoacetate number of 100 mgKOH/g. To a 500 mL, three-neck, round-bottom flask equipped with a mechanical stirrer, a heated partial condenser, a Dean-Stark trap, and a water condenser were added the above hydroxyl-functional polyester 3 (200.0 g) and t-butyl acetoacetate (56.33 g). The mixture was gradually heated and allowed to react at 120° C. for 20 minutes and at 140° C. for two hours. A total of 34 ml of the condensate (t-butanol) was collected in the Dean-Stark adapter. The resulting viscous resin was allowed to cool and subsequently collected. Glass transition temperature (Tg): 8.59° C.; number average molecular weight (Mn): 1703 g/mole; weight average molecular weight (Mw): 3408 g/mole.

Example 5. Formulation and Evaluation of Solvent-Borne Coating

A coating formulation was prepared by mixing AcAc polyester 3 of Example 4 (50% in MAK by weight) with the crosslinker, a mixture of 1,3- and 1,4-cyclohexanedicarboxaldehyde (CHDAL) and the catalyst, 1,8-diazabicyclo-[5.4.0]undec-7-ene (DBU) in n-propanol (25 weight %) as listed in Table 3. The formulations were formulated to have DBU (100%) at 3 weight % based on the total weight of the polyester (100%) and CHDAL. The resulting coating formulation was drawn down on cold-rolled steel test panels (thickness, about 10 μm). The coatings thus obtained were then allowed to cure either at room temperature or bake at 60° C. for one hour. The coating properties are listed in Table 4.

TABLE 3

Coating Compositions
Coating Composition

| Example Number | AcAc Polyester | Polyester Solution 50% in MAK), grams | CHDAL | DBU (25% in n-propanol) | DBU Ratio |
|---|---|---|---|---|---|
| 5 | 3 from Example 5 | 10 | 0.62 | 0.67 | 3% |

TABLE 4

Coating Propertes of Compositions of Table 3

| Formulation | Coating Observation (RT Drying) | | | | | Coating properties after baking at 60 C for one hour | |
|---|---|---|---|---|---|---|---|
| Example Number | Observation After 1 hour | After 3 hours | After 1 hour | Pendulum Hardness (overnight) | Gloss (overnight) | Pendulum Hardness | Gloss |
| Example 5 | Viscous liquid | very viscous | Non-tacky; glossy | 118 | 20° = 87.6 60° = 98.5 | 206 | 20° = 86.9 60° = 98.7 |

Example 6. Synthesis of Acetoacetate Functional Polyester 4 (AcAc Polyester 4)

The next synthesis was aimed to convert hydroxyl number of 130 mgKOH/g of the above hydroxyl functional polyester (3) from Example 5 to acetoacetate number of 130 mgKOH/g.

To a 500 mL, three-neck, round-bottom flask equipped with a mechanical stirrer, a heated partial condenser, a Dean-Stark trap, and a water condenser were added the above hydroxyl-functional polyester (3) (100.0 g) and t-butyl acetoacetate (36.61 g). The mixture was gradually heated and allowed to react at 120° C. for 20 minutes and at 140° C. for two hours. A total of 22 ml of the condensate (t-butanol) was collected in the Dean-Stark adapter. The resulting viscous resin was allowed to cool and subsequently collected. Glass transition temperature (Tg): 7.84° C.; number average molecular weight (Mn): 1767 g/mole; weight average molecular weight (Mw): 3452 g/mole.

Example 7. Synthesis of Acetoacetate Functional Polyester 5 (AcAc Polyester 5)

The next synthesis was aimed to convert hydroxyl number of 150 mgKOH/g of the above hydroxyl functional polyester (2) in Example 2 to acetoacetate number of 150 mgKOH/g.

To a 500 mL, three-neck, round-bottom flask equipped with a mechanical stirrer, a heated partial condenser, a Dean-Stark trap, and a water condenser were added the above hydroxyl-functional polyester 2 (200.0 g) and t-butyl acetoacetate (84.49 g). The mixture was gradually heated and allowed to react at 120° C. for 20 minutes and at 140° C. for two hours. A total of 22 ml of the condensate (t-butanol) was collected in the Dean-Stark adapter. The resulting viscous resin was allowed to cool and subsequently collected. Glass transition temperature (Tg): 4.36° C.; number average molecular weight (Mn): 1769 g/mole; weight average molecular weight (Mw): 3517 g/mole.

Example 8(a)-8(b). Formulation and Evaluation of Solvent-Borne Coatings

Coating formulations were prepared by mixing AcAc polyesters 4-5 from Examples 6 and 7 (50% in MAK) respectively with the crosslinker, a mixture of 1,3- and 1,4-cyclohexanedicarboxaldehyde (CHDAL) and the catalyst, 1,8-diazabicyclo-[5.4.0]undec-7-ene (DBU) in n-propanol (25 weight %) as listed in Table 5. The formulations were formulated to have DBU (100%) at 4 weight % based on the total weight of the polyester (100%) and CHDAL. The resulting coating formulations were drawn down on cold-rolled steel test panels (thickness, about 10 μm). The coatings thus obtained were then allowed to cure at RT for one week. The coating properties are listed in Table 6.

TABLE 5

Coating Compositions

| Example Number | Polyester (AcAc #: 100) of | Polyester Solution 50% in MAK), grams | CHDAL | DBU (25% in n-propanol) | DBU Ratio, % (defined above) |
|---|---|---|---|---|---|
| 8(a) | 4 | 10 | 0.81 | 0.93 | 4 |
| 8(b) | 5 | 10 | 0.94 | 0.95 | 4 |

TABLE 6

Coating Properties of Compositions in Table 5

| | | Coating Observation (RT Drying); pendulum hardness | | | Coating properties (RT Drying); MEK double rubs |
|---|---|---|---|---|---|
| Example Number | Formulation Observation After 1 hour | After one hour | After one day | After one week | After one week |
| 8(a) | light yellow, soft gel | 143 | 193 | 196 | 25-50 |
| 8(b) | light yellow, soft gel | 140 | 200 | 201 | 25-50 |

Example 9. Synthesis of Triacetoacetate Adduct (TMP TriAcAc)

A 500 mL three-neck round-bottom flask was equipped with a mechanical stirrer, a thermocouple, a heated partial condenser (105° C.), a Dean-Stark trap, and a water condenser. To the flask were charged trimethylolpropane (50.0 g), t-butyl acetoacetate (167.8 g), and the catalyst, Fascat 4100, 0.22 g. The mixture was heated and allowed to react at 120° C. for 20 minutes and at 140° C. for two hours. A total of 103 mL of the condensate (t-butanol) was collected in the Dean-Stark adapter. The resulting mixture was allowed to cool and the liquid product (TMP TriAcAc) collected.

Example 10(a)-(c). Formulation and Evaluation of Solvent-Borne Coating

Coating formulations were prepared by mixing AcAc polyesters 3-5 (50% in MAK) from Examples 4, 6 and 7, respectively, with TMP triAcAc from Example, 9, the crosslinker, a mixture of 1,3- and 1,4-cyclohexanedicarboxaldehyde (CHDAL) and the catalyst, 1,8-diazabicyclo-[5.4.0] undec-7-ene (DBU) in n-methanol (25 weight %) as listed in Table 7. The formulations were formulated to have polyester (100%)/TMP triAcAc ratio of 70/30 weight %. The resulting coating formulations were drawn down on cold-rolled steel test panels (thickness, about 10 μm). The coatings thus obtained were then allowed to cure at RT for one week. The coating properties are listed in Table 8. The degree of curing of the coatings was monitored by their solvent resistance as indicated by the numbers of the MEK double rubs test in accordance with ASTM D5402.

TABLE 7

Coating Properties

Coating Composition

| Formulation | AcAc Polyester | Polyester Solution 50% in MAK), grams | TMP triAcAc | CHDAL | DBU in methanol (25%) | Catalyst Ratio, % |
|---|---|---|---|---|---|---|
| 10(a) | 3 (AcAc #100) | 7 | 1.5 | 1.25 | 1.00 | 4 |
| 10(b) | 4 (AcAc #130) | 7 | 1.5 | 1.38 | 1.02 | 4 |
| 10(c) | 5 (AcAc #150) | 7 | 1.5 | 1.47 | 1.04 | 4 |

TABLE 8

Coating Propertes

| Example Number | Formulation Observation After one day | Coating Property (RT Drying); Pendulum Hardness | | | | Coating Property (RT Drying); MEK double rubs After one week |
|---|---|---|---|---|---|---|
| | | After one hour | After two hours | After one day | After one week | |
| 10(a) | Hard gel | 36 | 82 | 160 | 195 | 75 |
| 10(b) | Hard gel | 43 | 84 | 172 | 199 | 100 |
| 10(c) | Hard gel | 60 | 99 | 180 | 193 | 100 |

Example 11. Synthesis of Acetoacetate Functional Polyester 6 (AcAc Polyester 6)

Hydroxyl Functional Polyester 3: A hydroxyl functional polyester (3) from Example 4 with the composition of 2,2,4,4-tetramethyl-13-cyclobutanediol, neopentyl glycol, trimethylolpropane, hexahydrophthalic anhydride and adipic acid was prepared similarly as described in Example 1. The polyester had the properties of: acid number 10 mgKOH/g, hydroxyl number 130 mgKOH/g, and Tg 2° C.

The next synthesis was aimed to convert hydroxyl number of 100 mgKOH/g of the above hydroxyl functional polyester (3) from Example 4 to acetoacetate number of 100 mgKOH/g. To a 500 mL, three-neck, round-bottom flask equipped with a mechanical stirrer, a heated partial condenser, a Dean-Stark trap, and a water condenser were added the above hydroxyl-functional polyester 2 (100.0 g) and t-butyl acetoacetate (28.16 g). The mixture was gradually heated and allowed to react at 120° C. for 20 minutes and at 140° C. for two hours. A total of 15 ml of the condensate (t-butanol) was collected in the Dean-Stark adapter. The resulting viscous resin was allowed to cool and subsequently collected. Glass transition temperature (Tg): −7.5° C.; number average molecular weight (Mn): 2323 g/mole; weight average molecular weight (Mw): 9169 g/mole.

Example 12. Synthesis of Acetoacetate Functional Polyester 7 (AcAc Polyester 7)

Hydroxyl Functional Polyester 4:

A 500 mL, three-neck, round-bottom flask was equipped with a mechanical stirrer, a heated partial condenser, a Dean-Stark trap, and a water condenser. To the flask were charged 2-methyl-1,3-propanediol (MPDiol) (60.2 g), 2,2,4,4-tetramethyl-13-cyclobutanediol (TMCD) (96.4 g); trimethylolpropane (TMP) (13.28 g); isophthalic acid (IPA) (182.8 g) and the acid catalyst, Fascat-4100 (Arkema Inc.) (0.35 g). The reaction was allowed to react under nitrogen at 200° C. for two hours and at 230° C. for about 2 hours to yield a clear, viscous mixture. A total of 42.5 mL of distillate was collected in the Dean-Stark trap. The resulting mixture was allowed to cool and subsequently collected. Acid number: <1.0 mgKOH/g; hydroxyl number: 105.8 mgKOH/g; glass transition temperature (Tg): 44.1° C.; number average molecular weight (Mn): 1748 g/mole; weight average molecular weight (Mw): 4166 g/mole.

Acetoacetate Functional Polyester 7:

The next synthesis was aimed to convert hydroxyl number of 100 mgKOH/g of the above hydroxyl functional polyester (1) to acetoacetate number of 100 mgKOH/g. To the above hydroxyl-functional polyester (4) (150.0 g) was added t-butyl acetoacetate (42.25 g). The mixture was gradually heated and allowed to react at 120° C. for 20 minutes and at 140° C. for two hours. A total of 22 mL of the condensate (t-butanol) was collected in the Dean-Stark adapter. The resulting viscous resin was allowed to cool and subsequently collected. Glass transition temperature (Tg): 22.3° C.; number average molecular weight (Mn): 1986 g/mole; weight average molecular weight (Mw): 4396 g/mole.

Example 13(a)-13(c). Formulation and Accelerating Weathering Study of Coatings

Coating formulations were prepared by mixing AcAc polyesters 3, 6, and 7 (50% in MAK) from Examples, 4, 11 and 12, respectively, with the crosslinker, a mixture of 1,3- and 1,4-cyclohexanedicarboxaldehyde (CHDAL), the catalyst, 1,8-diazabicyclo-[5.4.0]undec-7-ene (DBU) in n-propanol (25 weight %), the hindered-amine light stabilizer, Tinuvin 292, and the UV absorber, Tinuvin 400 (both available from BASF) as listed in Table 9. The formulations were formulated to have DBU (100%) at 4 or 3 weight % based on the total weight of the polyester (100%) and CHDAL. Tinuvin 292 and Tinuvin 400 ratios were also based on the total weight of the polyester (100%) and CHDAL excluding all the solvents. The resulting coating formulations were drawn down on cold-rolled steel test panels with a precoated epoxy primer. The coatings (thickness, about 75 μm) thus obtained were then allowed to cure at 60° C. for two hours and then at room temperature for two weeks. The coatings were then subject to accelerated weathering study in accordance with ASTM Method G155. The gloss retention results are listed in Table 10.

TABLE 9

Coating Compositions

| Formulation | Polyester (AcAc #:100) | Polyester Solution 50% in MAK, grams | CHDAL | DBU (25% in n-propanol) | Tinuvin 292 (100%), gram (1%) | Tinuvin 400 (50% in MAK), gram (1.2%) | DBU Ratio, % |
|---|---|---|---|---|---|---|---|
| 13(a) | 3 | 10 | 0.62 | 0.90 | 0.056 | 0.135 | 4 |
| 13(b) | 6 | 10 | 0.62 | 0.67 | 0.056 | 0.135 | 3 |
| 13(c) | 7 | 10 | 0.62 | 0.67 | 0.056 | 0.135 | 3 |

TABLE 10

Accelerated Weathering Study

| Coating | 60 Degree Gloss Retention (%) | | | 20 Degree Gloss Retention (%) | | |
|---|---|---|---|---|---|---|
| | After 500 hrs. | After 1000 hrs. | After 1500 hrs. | After 500 hrs. | After 1000 hrs. | After 1500 hrs. |
| 13(a) | 99.2 | 99.6 | 99.4 | 97.5 | 95.8 | 95.8 |
| 13(b) | 98.8 | 97.3 | 93.8 | 94.7 | 89.1 | 81.6 |
| 13(c) | 93.8 | 54.6 | — | 84.2 | 16.2 | — |

Example 14. Preparation of High-Solids Coating Formulations

High-solids coating formulations were prepared by mixing AcAc polyesters 4 from Example 6, respectively, with the crosslinker, a mixture of 1,3- and 1,4-cyclohexanedicarboxaldehyde (CHDAL), and the catalyst, 1,8-diazabicyclo-[5.4.0]undec-7-ene (DBU) in n-methanol (25 weight %), as listed in Table 11. Formulations 14(a), 14 (b), and 14(c) were prepared using 70% polyester solution in MAK by weight, while formulation 14(d) using 60% polyester solution. Formulations 14(b) and 14(d) contained TMP triAcAc at a ratio of AcAc polyster/TMP triAcAc=80/20 by weight, while formulation 14(c) contained NPG diAcAc (diacetoacetate of neopentyl glycol) at 80/20. As shown in the Table 11, formulations 14(a) to 14(c) had calculated % solids of 73.1, 78.3, 78.2, and 69.9% respectively. The formulations remained fluid for at least one hour.

TABLE 11

High-Solids Coating Compositions

| Formulation | Polyester Solution in MAK), grams | TMP triAcAc | NPGdiAcAc | CHDAL | DBU (25% in n-methanol) | DBU Ratio | % Solids | Formulation Observation | | |
|---|---|---|---|---|---|---|---|---|---|---|
| | | | | | | | | After 2 hours | After 5 hours | Overnight |
| 14 (a) | 10 (70%) | | | 1.14 | 1.3 | 4 phr | 73.10% | Viscous, flow | Rubbery | Hard rubber |
| 14 (b) | 8 (70%) | 1.4 | | 1.67 | 1.39 | 4 phr | 78.30% | viscous, did not flow | Hard rubber | Extremely hard |
| 14 (c) | 8 (70%) | | 1.4 | 1.63 | 1.38 | 4 phr | 78.20% | Viscous, flow | Sticky gel | Hard rubber |
| 14 (d) | 8 (60%) | 1.2 | | 1.43 | 1.19 | 4 phr | 69.90% | Viscous, flow | Rubbery | Hard rubber |

The invention has been described in detail with reference to the embodiments described herein, but it will be understood that variations and modifications can be effected within the scope of the invention.

What is claimed is:

1. A curable coating composition comprising:
I. a polyester having two or more beta-ketoester groups, wherein said polyester (I) is an acetoacetate functional polyester comprising the residues of
   a. a hydroxyl component comprising:
      i. a diol in an amount ranging from 70 to 97 mole %, based on the total moles of (i) and (ii); and
      ii. a polyol in an amount ranging from 3 to 30 mole %, based on the total moles of (i) and (ii), wherein the polyol is one or more of 1,1,1-trimethylol propane, 1,1,1-trimethylolethane, glycerin, and pentaerythritol;
   b. a carboxyl component comprising a polycarboxylic acid compound, a derivative of polycarboxylic acid compound, or a combination thereof; and
   c. an alkyl acetoacetate, a diketene, or a combination thereof in an amount ranging from about 5 to about 50 weight %, based on the total weight of (a), (b), and (c)
II. a curing agent having two or more aldehyde functional groups, wherein the curing agent is selected from the group consisting of 1,3-cyclohexanedicarboxaldehyde, 1,4-cyclohexanedicarboxaldehyde, mixtures of 1,3-and 1,4-cyclohexanedicarboxaldehyde, 2,6-norbornanedicarboxaldehyde, 2,5-norbornane-dicarboxaldehyde, cyclododecane-1,4,8-tricarbaldehyde, and 3, (4-formylcyclohexyl) propanal, and
III. a basic catalyst, wherein the basic catalyst is one or more selected from the group consisting of 1,8-diazabicyclo-[5.4.0] undec-7-ene, 1,5-diazabicyclo [4.3.0] non-5-ene, 1,5,7-triazabicyclo [4.4.0] dec-5-ene, 7-methyl-1,5,7- triazabicyclo [4.4.0] dec-5-ene (MTBD), 1,1,3,3-tetramethylguanidine, and 1,4-diazabicyclo [2.2.2] octane.

2. The curable coating composition of claim 1, wherein the diol component (a) (i) is in an amount ranging from about 85 to about 95 mole %, based on the total moles of (i) and (ii), and the polyol component (a) (ii) is in an amount ranging from about 5 to about 15 mole %, based on the total moles of (i) and (ii).

3. The curable coating composition of claim 1, wherein said alkyl acetoacetate is in an amount ranging from about 15 to about 30 weight %.

4. The curable coating composition of claim 1, wherein the diol component (ai) is one or more selected from the group consisting of 2,2-dimethyl-1,3-propanediol (neopentyl glycol), 2-methyl-1,3-propanediol, 2-butyl-2-ethyl-1,3-propanediol, 1,4-butanediol, 1,6-hexanediol, 1,2-cyclohexanedimethanol, 1,3-cyclohexanedimethanol, 1,4-cyclohexanedimethanol, 2,2,4-trimethyl-1,3-pentanediol, hydroxypivalyl hydroxypivalate, 2,2,4,4-tetramethylcyclobutane-1,3-diol, and polyethylene glycol.

5. The curable coating composition of claim 1, wherein the diol (a) (i) comprises 2,2,4,4-tetramethylcyclobutane-1, 3-diol.

6. The curable coating composition of claim 1, wherein the carboxyl component (b) is one or more selected from the group consisting of adipic acid, isophthalic acid (or dimethyl isophthalate), 1,4-cyclohexanedicarboxylic acid, 1,3-cyclohexanedicarboxylic acid, hexahydrophthalic anhydride, maleic anhydride, succinic anhydride, phthalic acid, and phthalic anhydride.

7. The curable coating composition of claim 1, wherein the diol (a) (i) comprises 2,2,4,4-tetramethylcyclobutane-1, 3-diol and the carboxyl component (b) comprises hexahydrophthalic anhydride.

8. The curable coating composition of claim 1, wherein said alkyl acetoacetate is one or more selected from t-butyl acetoacetate, methyl acetoacetate, ethyl acetoacetate, n-propyl acetoacetate, isopropyl acetoacetate, and n-butyl acetoacetate.

9. The curable coating composition of claim 1, wherein said polyester (I) has a glass transition temperature (Tg) of about −20°° C. to about 60°° C.

10. The curable coating composition of claim 1, further comprising one or more organic solvents selected from the group comprising ethyl acetate, butyl acetate, xylene, methyl amyl ketone, methyl ethyl ketone, and toluene.

11. The curable coating composition of claim 1, wherein the basic catalyst is in an amount ranging from 0.5 to 5 weight % based on the total weight of (I) and (II).

12. The curable coating composition of claim 1, wherein said polyester is an acetoacetate functional polyester comprising the residues of
   a. said hydroxyl component comprising:
      i. 2,2,4,4-tetramethylcyclobutane-1,3-diol in an amount ranging from 10 to 60 mole %, based on the total moles of (i), (ii), and (iii);
      ii. a diol other than 2,2,4,4-tetramethylcyclobutane-1, 3-diol in an amount ranging from 35 to 85 mole %, based on the total moles of (i), (ii), and (iii); and iii. a polyol in an amount ranging from 5 to 15 mole %, based on the total moles of (i), (ii), and (iii);
b. said carboxyl component comprising:
   iv. hexahydrophthalic anhydride in an amount ranging from 50 to 100 mole % based on the total moles of (iv) and (v), and
   v. a polycarboxylic acid compound other than hexahydrophthalic anhydride in an amount ranging from 0 to 50 mole % based on the total moles of (iv) and (v); and
c. said alkyl acetoacetate, said diketene, or said combination thereof in an amount ranging from about 15 to about 30 weight %, based on the total weight of (a), (b), and (c).

13. The curable coating composition of claim 1, wherein said polyester (I) is an acetoacetate functional polyester, the curing agent (II) is selected from 1,3-cyclohexanedicarboxaldehyde, 1,4-cyclohexane-dicarboxaldehyde, and mixtures of 1,3-and 1,4-cyclohexanedicarboxaldehyde.

14. The curable coating composition of claim 13, wherein the equivalent ratio of the acetoacetate functionality in the polyester (I) to the aldehyde functionality in the curing agent (II) is from about 1.2 to 0.9.

15. The curable coating composition of claim 1 further comprising an adduct having two or more β-ketoacetate functional groups selected from 2-methyl-1,3-propanediol diacetoacetate, neopentyl glycol diacetoacetate, 2,2,4,4-tetramethylcyclobutane-1,3-diacetoacetate, and trimethylolpropane triacetoacetate.

* * * * *